United States Patent
Harada (10) Patent No.: US 10,802,240 B2
(45) Date of Patent: Oct. 13, 2020

(54) LENS DRIVING DEVICE

(71) Applicant: OLYMPUS CORPORATION, Hachioji-shi, Tokyo (JP)

(72) Inventor: Junya Harada, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 99 days.

(21) Appl. No.: 16/253,651

(22) Filed: Jan. 22, 2019

(65) Prior Publication Data

US 2019/0227252 A1  Jul. 25, 2019

(30) Foreign Application Priority Data

Jan. 22, 2018 (JP) ................. 2018-008254

(51) Int. Cl.
| | |
|---|---|
| *G02B 7/04* | (2006.01) |
| *G02B 7/02* | (2006.01) |
| *G03B 17/14* | (2006.01) |
| *G02B 7/10* | (2006.01) |

(52) U.S. Cl.
CPC ............ *G02B 7/022* (2013.01); *G02B 7/026* (2013.01); *G02B 7/102* (2013.01); *G03B 17/14* (2013.01)

(58) Field of Classification Search
CPC ........ G02B 7/022; G02B 7/026; G02B 7/102; G02B 7/08
See application file for complete search history.

(56) References Cited

U.S. PATENT DOCUMENTS 8,861,103 B2   10/2014   Tsuzuki
2012/0050893 A1 *  3/2012   Wakayama ........ G02B 27/0068
                                                    359/811

FOREIGN PATENT DOCUMENTS

JP   2012252288 A   12/2012

\* cited by examiner

*Primary Examiner* — Joseph P Martinez (74) *Attorney, Agent, or Firm* — Holtz, Holtz & Volek PC (57) ABSTRACT

A lens driving device includes a lens frame that holds a lens, a rack provided pivotally with respect to the lens frame around a pivot shaft along an optical axis of the lens, a lead screw provided along the optical axis, a spring that makes the rack pivot around the pivot shaft, pushes the rack against the lead screw, and engages a tooth of the rack with a tooth of the lead screw, a driving unit that rotates the lead screw, and a nut that includes an end surface facing the rack along the optical axis with a gap C being included therebetween, that engages with the lead screw with backlash being included therebetween, and that is provided un-rotatably with respect to the lens frame. In a case where a half pitch of the tooth of the lead screw is A and the backlash along the optical axis between the lead screw and the nut is B, $A > B + C$ is satisfied.

9 Claims, 6 Drawing Sheets

LENS DRIVING DEVICE

CROSS-REFERENCE TO RELATED APPLICATIONS

This application is based upon and claims the benefit of priority from Japanese Patent Application No. 2018-008254, filed Jan. 22, 2018; the entire contents of which are incorporated herein by reference.

BACKGROUND

Field

The present invention relates, for example, to a lens driving device that drives a lens in an optical axis direction.

Description of the Related Art

A lens driving device is provided, for example, in an interchangeable lens of a camera. The interchangeable lens includes a lens barrel. A plurality of lenses is provided side by side in an optical axis direction in the lens barrel. The lens driving device drives a focusing lens or a zoom lens in the optical axis direction in the lens barrel.

The lens driving device includes, for example, a lens frame that holds a lens, a rack provided in the lens frame, a lead screw engaged with the rack, and a motor that rotates the lead screw. The lead screw is provided in parallel with an optical axis. The rack includes a tooth engaged with a tooth of the lead screw.

When the motor rotates, the lead screw rotates, and the rack engaged with the lead screw moves in the optical axis direction. When the rack moves, the lens frame that holds the lens moves in the optical axis direction.

The rack is pushed against the lead screw by the spring. In other words, the spring biases the rack in a direction orthogonal to the optical axis direction and pushes the rack against the lead screw. Thus, in a case where strong impact is applied to the interchangeable lens from the outside, the rack moves in a direction of getting away from the lead screw against biasing force of the spring. With this, a stress by the impact is released.

However, when tooth-skipping or a crack is generated in the rack by the impact from the outside, accurate drive control of the lens becomes impossible.

BRIEF SUMMARY OF THE INVENTION

One aspect of a lens driving device of the present invention includes a lens frame that holds a lens, a rack provided pivotally with respect to the lens frame around a pivot shaft along an optical axis of the lens, a lead screw provided along the optical axis, a spring that makes the rack pivot around the pivot shaft, that pushes the rack against the lead screw, and that engages a tooth of the rack with a tooth of the lead screw, a driving unit that rotates the lead screw, and a nut that includes an end surface facing the rack via a gap C along the optical axis, that engages with the lead screw with backlash being included therebetween, and that is provided un-rotatably with respect to the lens frame. In a case where a half pitch of the tooth of the lead screw is A and the backlash along the optical axis between the lead screw and the nut is B, A>B+C is satisfied.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

In the following, an embodiment of the present invention will be described with reference to the drawings.

Figure 1:
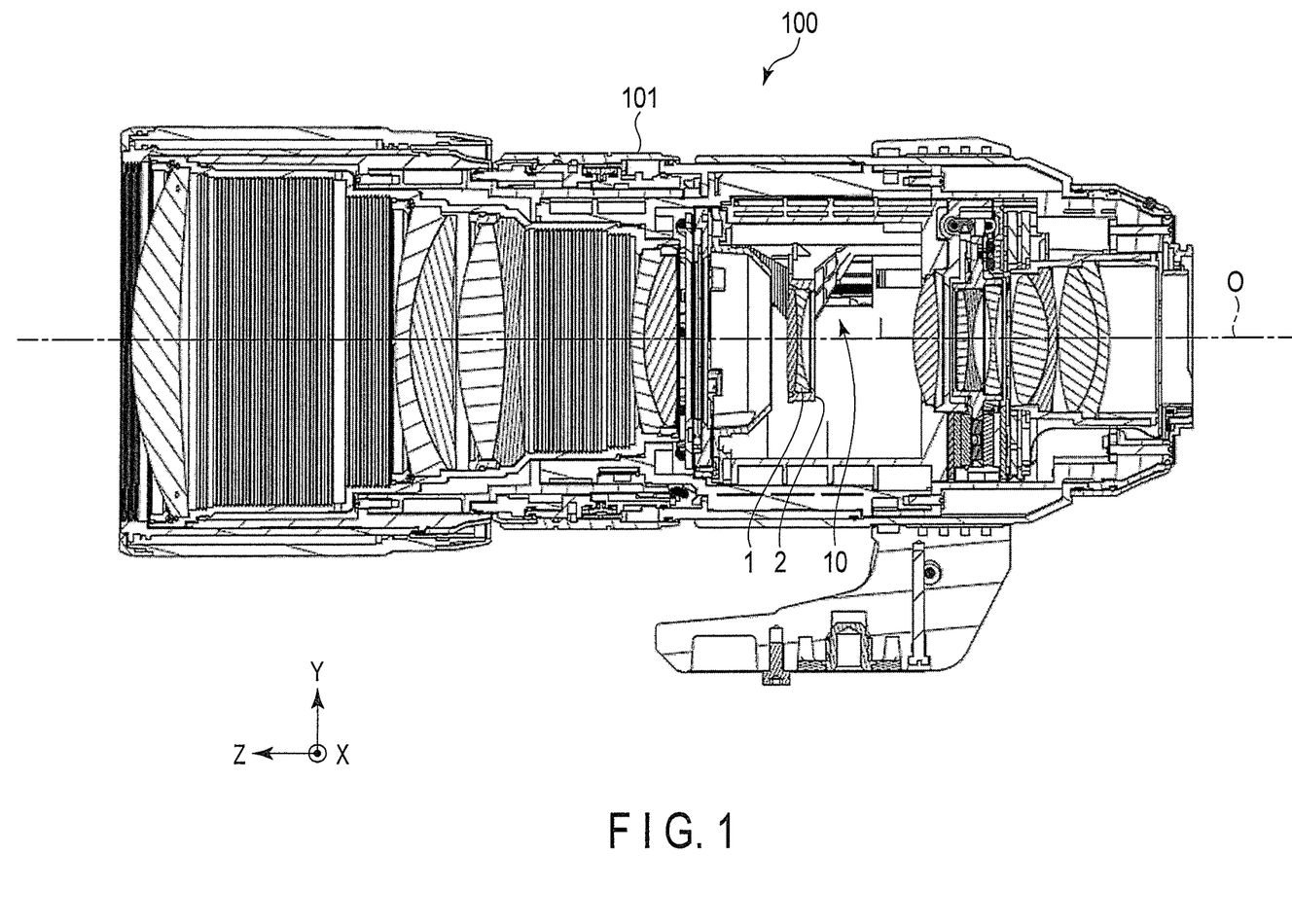
FIG. 1 is a sectional view illustrating an interchangeable lens including a lens driving device according to an embodiment.

As illustrated in FIG. 1, an interchangeable lens 100 of a camera includes a lens barrel 101 that houses a plurality of lenses. The lenses are provided coaxially along an optical axis O. For example, a focusing lens 1 in the lenses is attached movably in a direction of the optical axis O by a lens driving device 10. It is also possible to movably attach a different lens such as a zoom lens in the lens barrel 101 by the lens driving device 10. In the following description, a direction from a camera main body (not illustrated) toward an object (not illustrated) is called a front side and the opposite thereof is called a rear side.

Figure 2:
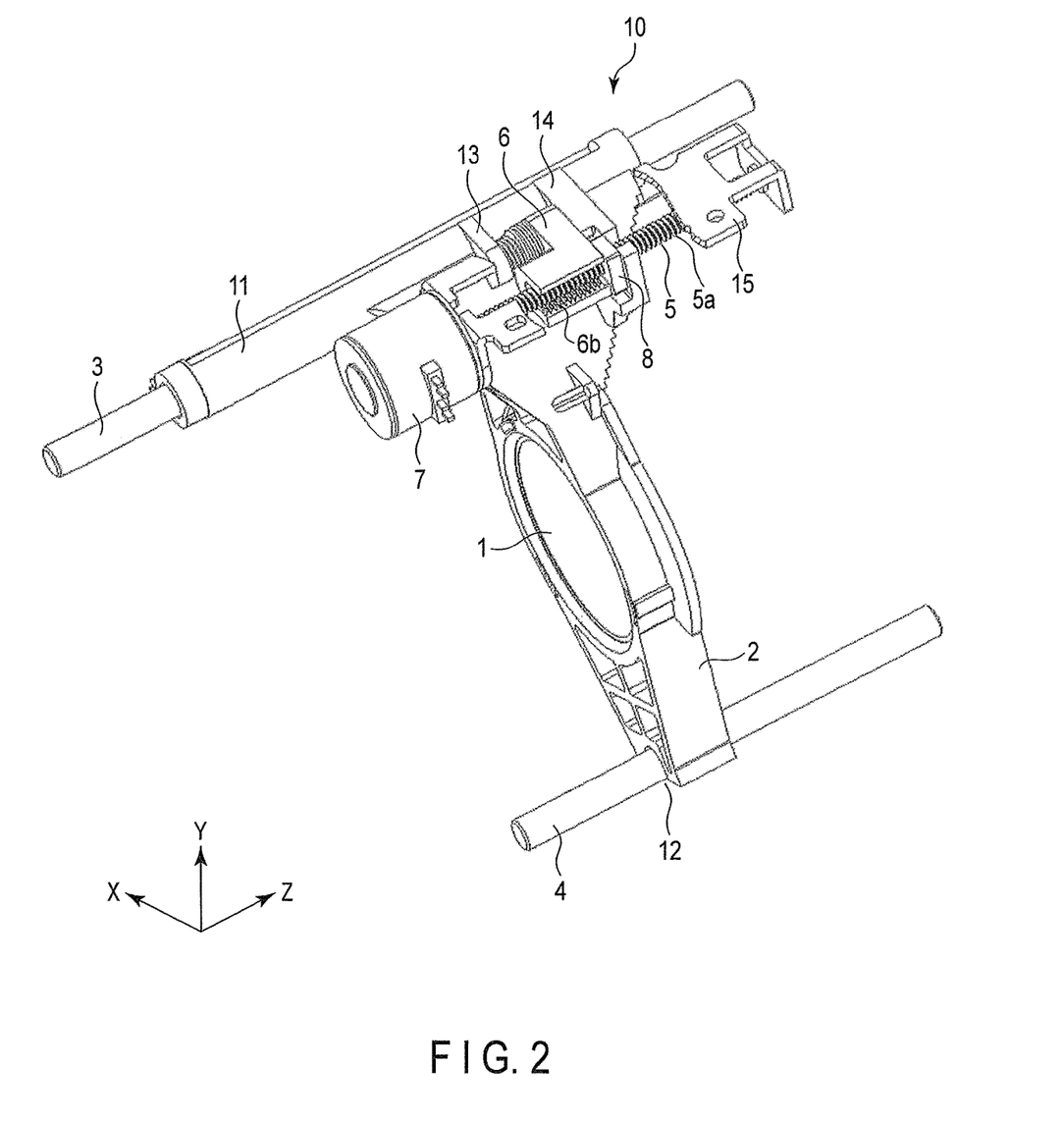
FIG. 2 is a perspective view illustrating the lens driving device according to the embodiment.

As illustrated in FIG. 2, the lens driving device 10 includes a lens frame 2 that holds the focusing lens 1, a suspension shaft 3 and a rotation stopping shaft 4 that support the lens frame 2 slidably along the optical axis O, a lead screw 5 extended along the optical axis O, a rack 6 attached pivotally with respect to the lens frame 2 via a pivot shaft 6a (FIG. 3) in parallel with the optical axis O, a motor 7 (driving unit) that rotates the lead screw 5, and a nut 8. The suspension shaft 3 and the rotation stopping shaft 4 are attached to the lens barrel 101.

The lens frame 2 integrally includes a sliding sleeve 11 in which the suspension shaft 3 is inserted. The sliding sleeve 11 is extended along the optical axis O. The lens frame 2 is supported slidably along the suspension shaft 3 via the sliding sleeve 11. Also, the lens frame 2 includes a U-shaped receiving groove 12 that receives the rotation stopping shaft 4 slidably on an opposite side of the sliding sleeve 11 with the optical axis O therebetween. Moreover, the lens frame 2 integrally includes a pair of supporting pieces 13 and 14 to attach the rack 6. The supporting pieces 13 and 14 are extended in a direction orthogonal to the optical axis O.

Figure 3:
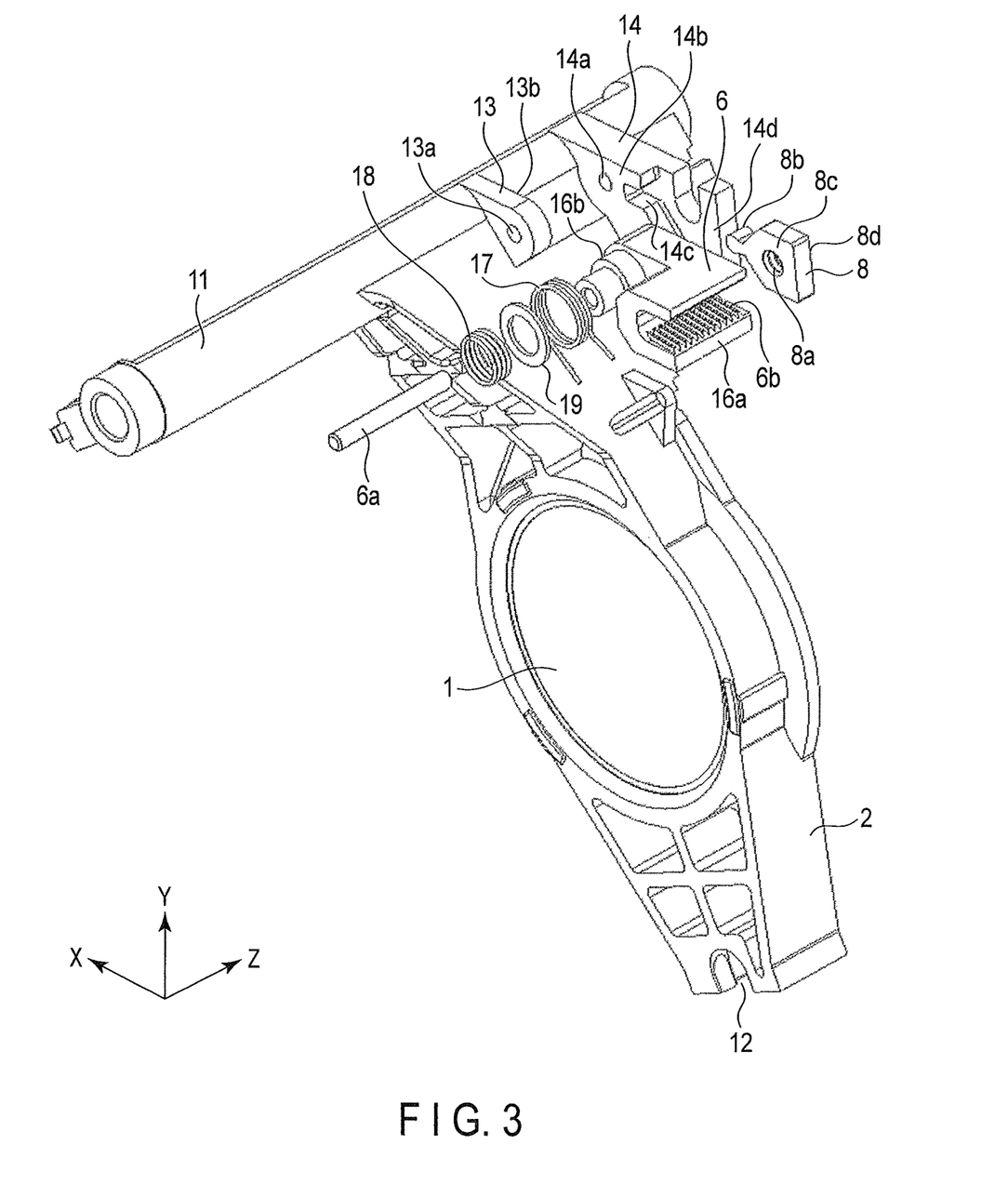
FIG. 3 is a perspective view illustrating a part of the lens driving device in FIG. 2 in an exploded manner.

As illustrated in FIG. 3, the supporting pieces 13 and 14 are arranged in a manner of being separated from each other along the optical axis O. The supporting pieces 13 and 14 respectively include fixing holes 13a and 14a into which both ends of the pivot shaft 6a of the rack 6 are pressed and fixed. The end parts of the pivot shaft 6a may be fixed to the supporting pieces 13 and 14, for example, with an adhesive. The rack 6 is pivotable with respect to the pivot shaft 6a. The fixing holes 13a and 14a are provided coaxially side by side in the direction of the optical axis O. An interval between facing inner surfaces 13b and 14b of the supporting pieces 13 and 14 is slightly longer than a width of the rack 6.

The lead screw 5 is attached to the lens frame 2 via a holding frame 15. The holding frame 15 is illustrated in FIG. 2 in a state in which a part thereof is broken out. The holding frame 15 includes, for example, a structure in which both ends of a substantially rectangular metallic plate are bent at a substantially right angle to a side of the same surface. A shaft receiving hole (not illustrated) that supports the lead screw 5 rotatably is provided in the bent both end parts of the holding frame 15. The motor 7 is fixedly provided on an outer surface side of a rear end part of the holding frame 15. A rotary shaft of the motor 7 penetrates the rear end part of the holding frame 15 and is connected to the lead screw 5 coaxially.

Figure 4:
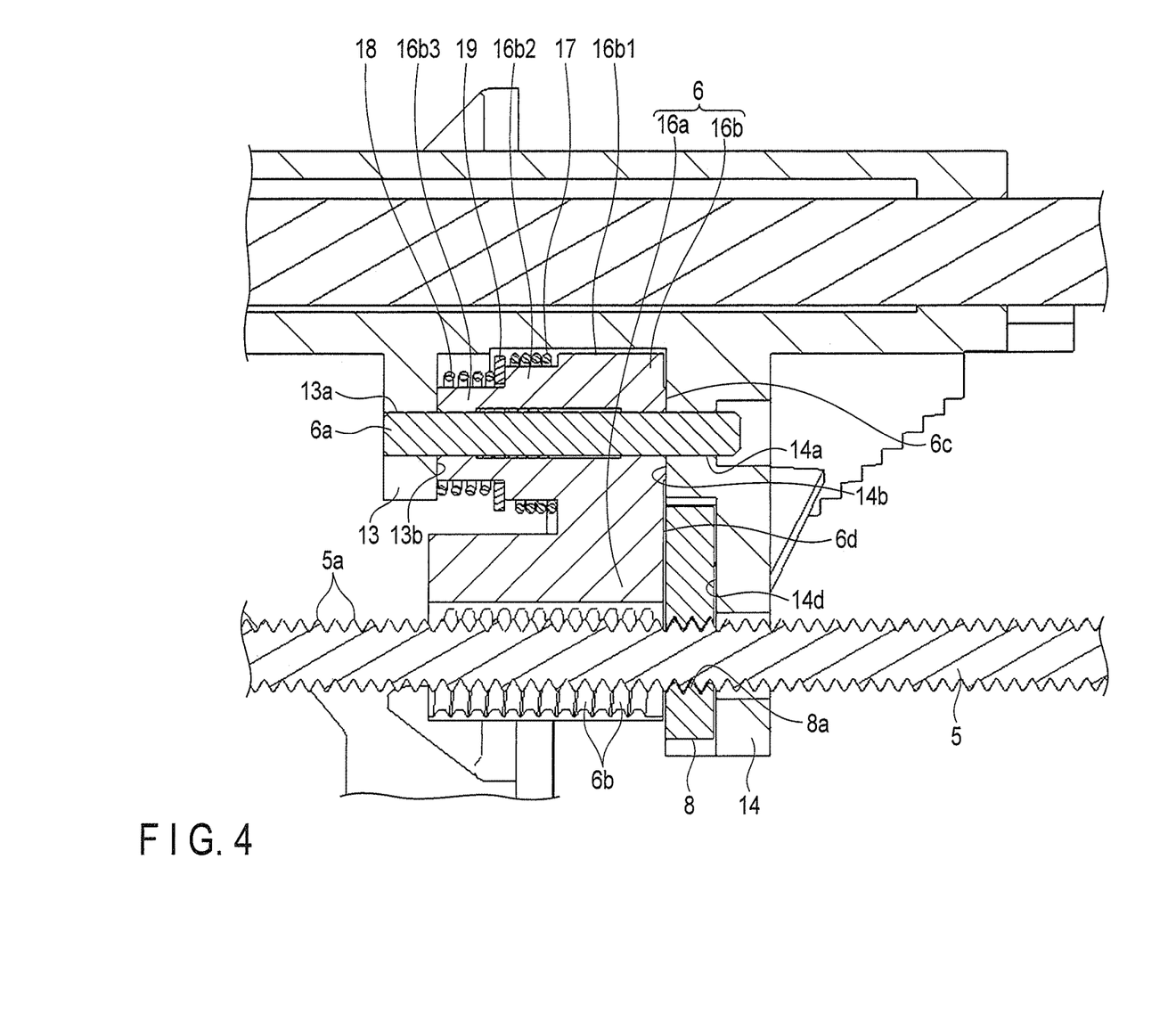
FIG. 4 is a sectional view illustrating a main part of the lens driving device in FIG. 2 in a partially enlarged manner.

As illustrated in FIG. 3 and FIG. 4, the rack 6 includes a plurality of linear teeth 6b engaged with a helical tooth 5a of the lead screw 5. The rack 6 integrally includes an engagement part 16a a cross-section of which is formed in a substantially U-shape, and a shaft part 16b into which the pivot shaft 6a is inserted. The teeth 6b are provided in one inner surface of the engagement part 16a in a manner of being inclined along the helical tooth 5a of the lead screw 5. That is, the teeth 6b are slightly inclined in a direction orthogonal to the pivot shaft 6a.

The shaft part 16b of the rack 6 has a shape with an outer diameter being gradually decreased toward the rear side. That is, the shaft part 16b includes a large-diameter part 16b1, a middle-diameter part 16b2, and a small-diameter part 16b3. A torsional spring 17 is attached to an outer surface of the middle-diameter part 16b2, and a compression spring 18 is attached to an outer surface of the small-diameter part 16b3. A washer 19 is arranged between the torsional spring 17 and the compression spring 18. The washer 19 has an inner diameter larger than the small-diameter part 16b3 and smaller than the middle-diameter part 16b2.

One end of the torsional spring 17 is fixed to the rack 6 and the other end of the torsional spring 17 is fixed to the lens frame 2. In this state, the torsional spring 17 biases the rack 6 in a direction of pushing against the lead screw 5 with the pivot shaft 6a at a center. In other words, the torsional spring 17 is attached between the rack 6 and the lens frame 2 in a state of being capable of pushing the rack 6 against the lead screw 5 with restoring force thereof.

Also, the compression spring 18 is arranged between the supporting piece 13 and the washer 19 in a state of being pushed and compressed in an axial direction. The compression spring 18 eliminates backlash in the direction of the optical axis O of the rack 6 by pushing the rack 6 against the supporting piece 14. That is, the rack 6 is biased in a right direction in FIG. 4 by the compression spring 18, and an abutting surface 6c of the rack 6 abuts on the inner surface 14b of the supporting piece 14 on a front side of the lens frame 2. With this, the rack 6 is accurately positioned in the direction of the optical axis O with respect to the lens frame 2.

The nut 8 is arranged on a front side of the rack 6 via a predetermined gap. The nut 8 is, for example, a whole-circumference nut that includes a tooth 8a, which engages with the helical tooth 5a of the lead screw 5, in whole circumference. The nut 8 is not necessarily the whole-circumference nut and may be one with a crack of a part in a circumference direction, or a half nut. In either case, the nut 8 is engaged with the lead screw 5 with backlash being included in the direction of the optical axis O with respect to the lead screw 5.

Also, the nut 8 integrally includes a projection 8b (FIG. 3) to stop rotation with respect to the lens frame 2. On the one hand, a groove 14c that receives the projection 8b of the nut 8 slidably in the optical axis direction is provided in the supporting piece 14 extended from the lens frame 2. Also, the supporting piece 14 includes an abutment surface 14d placed on a front side of the inner surface 14b. A step between the inner surface 14b and the abutment surface 14d of the supporting piece 14 is slightly larger than a thickness of the nut 8. Then, the above-described groove 14c that connects the inner surface 14b and the abutment surface 14d is provided in this step part. The groove 14c is extended in the direction of the optical axis O. Thus, the nut 8 is provided movably in the direction of the optical axis O within a range of the step between the inner surface 14b and the abutment surface 14d.

In the lens driving device 10 with the above configuration, the rack 6 engaged with the lead screw 5 moves in the direction of the optical axis O when the motor 7 is biased and the lead screw 5 is rotated. Here, the nut 8 also moves in the direction of the optical axis O along with the lens frame 2. The nut 8 is provided slightly movably in the direction of the optical axis O with respect to the lens frame 2 (supporting piece 14) and the rack 6. The nut 8 is engaged with the lead screw 5 with backlash. The nut 8 is basically in a non-contact state with respect to the abutment surface 14d of the supporting piece 14 and a front end surface 6d (that function as abutment surface 6d on opposite side) of the rack 6.

Figure 5:
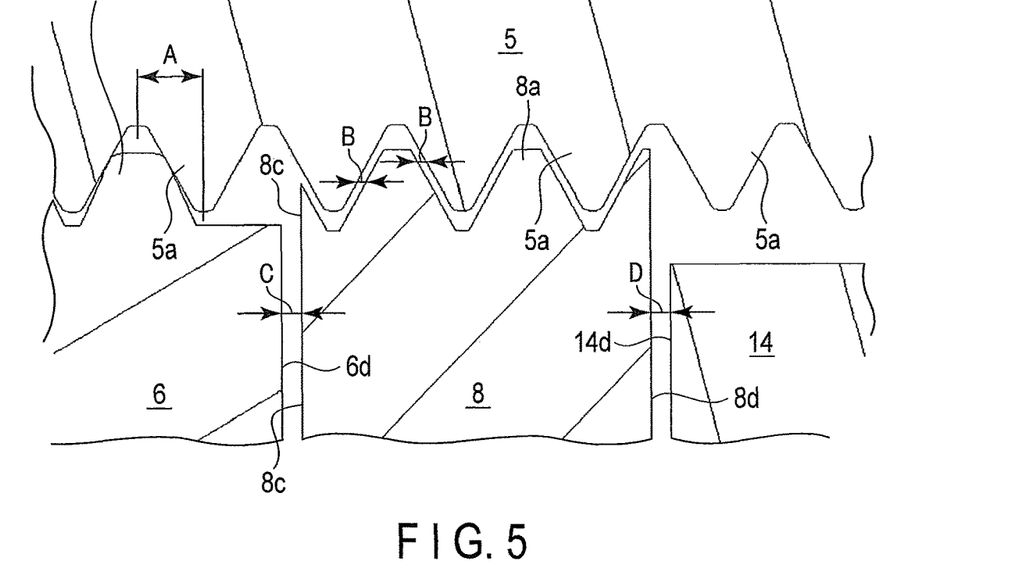
FIG. 5 is a sectional view illustrating an engagement part of a rack and a nut with a lead screw of the lens driving device in FIG. 2 in a partially enlarged manner.
Figure 6:
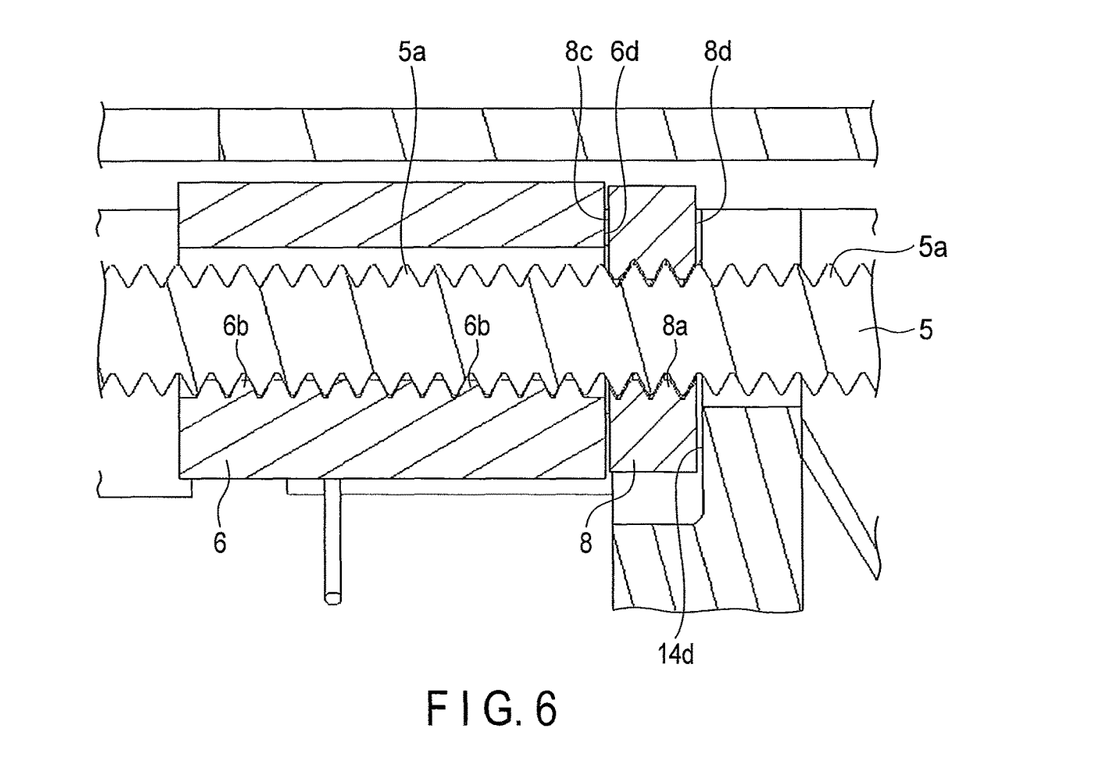
FIG. 6 is a sectional view illustrating an engagement state of the rack and the nut with the lead screw of the lens driving device in FIG. 2.
Figure 7:
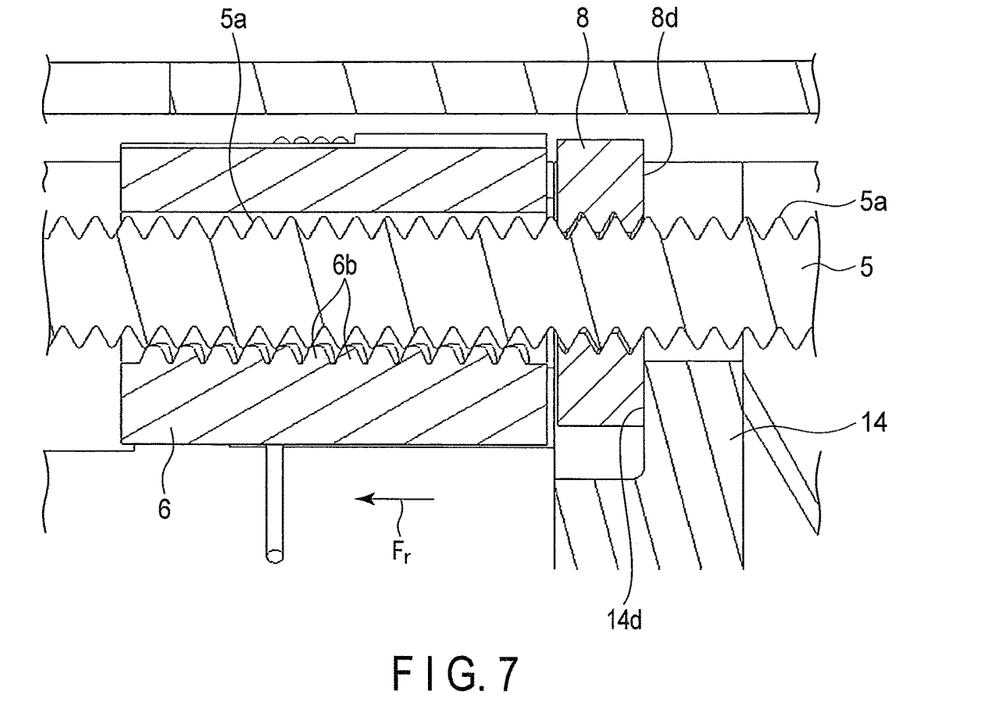
FIG. 7 is a sectional view illustrating an engagement state of when a stress toward a rear side affects the rack from the state in FIG. 6.
Figure 8:
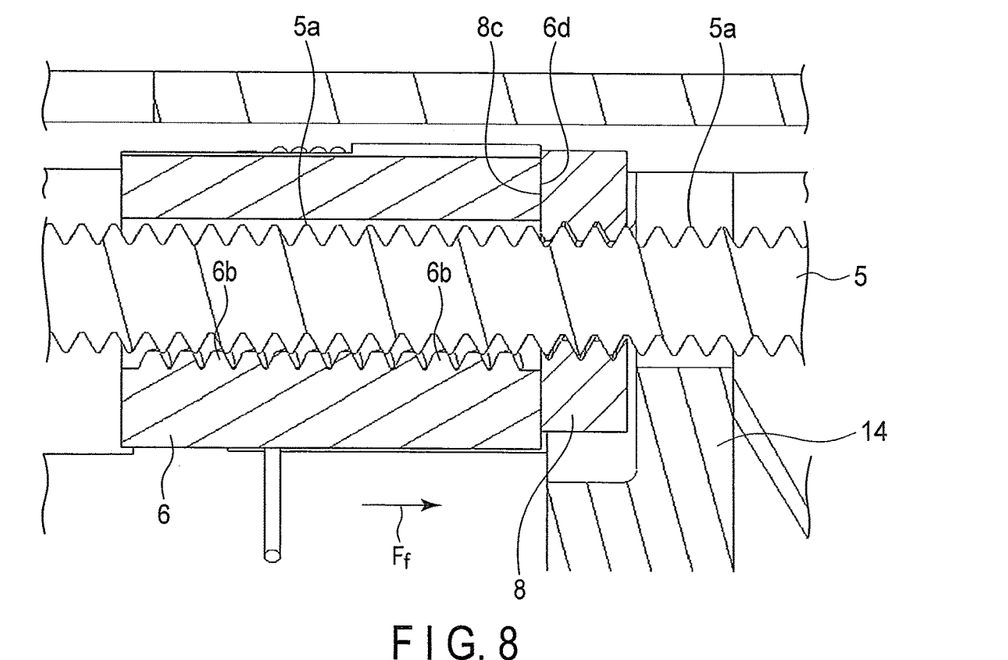
FIG. 8 is a sectional view illustrating an engagement state of when a stress toward a front side affects the rack from the state in FIG. 6.

FIG. 5 is a sectional view in which an engagement part between the teeth 6b of the rack 6 and the tooth 5a of the lead screw 5 and an engagement part between the tooth 8a of the nut 8 and the tooth 5a of the lead screw 5 when the lens driving device 10 operates properly are partially enlarged. FIG. 6 is a sectional view illustrating an engagement state of the rack 6 and the nut 8 with the lead screw 5 of when the lens driving device 10 operates properly. FIG. 7 is a sectional view illustrating an engagement state of a case where a stress Fr in a left direction in the drawing affects the rack 6, and FIG. 8 is a sectional view illustrating an engagement state of a case where a stress Ff in a right direction in the drawing affects the rack 6. In the following, a function of the lens driving device 10 of the present embodiment will be described with reference to FIG. 5 to FIG. 8.

First, as a precondition, it is assumed that a half of a pitch in the direction of the optical axis O of the tooth 5a of the lead screw 5 (hereinafter, referred tows half pitch) is A, backlash in the direction of the optical axis O (thrust direction) between the tooth 5a of the lead screw 5 and the tooth 8a of the nut 8 is B, a distance between the abutment surface 6d of the rack 6 and a rear end surface 8c of the nut 8 is C, and a distance between the abutment surface 14d of the supporting piece 14 and a front end surface 8d of the nut 8 is D in proper operation illustrated in FIG. 5.

In the present embodiment, a size of each part was designed to satisfy the following expressions (1) and (2) in consideration of the above precondition.

$$A > B + C \quad (1)$$

$$A > B + D \quad (2)$$

For example, in a case where strong impact is applied to the lens frame 2 such as a case where the interchangeable lens 100 is dropped, the rack 6 of the lens driving device 10 moves in a direction of getting away from the lead screw 5 against biasing force of the torsional spring 17. Accordingly, application of the strong impact to the teeth 6b of the rack 6 is prevented and a trouble such as a crack of the teeth 6b of the rack 6 is prevented.

Here, for example, as illustrated in FIG. 7, when the stress Fr toward the rear side affects the lens frame 2, the supporting piece 14 of the lens frame 2 also moves to the rear side and the abutment surface 14d of the supporting piece 14 abuts on the front end surface 8d of the nut 8. Then, moreover, the nut 8 is pushed toward the rear side by the abutment surface 14d and moves slightly, and the tooth 8a of the nut 8 is engaged with the tooth 5a of the lead screw 5. Accordingly, further movement of the lens frame 2 toward the rear side is prohibited. That is, when the above-described expression (1) is satisfied, it is possible to prevent the lens frame 2 from moving toward the rear side beyond the half pitch of the tooth 5a of the lead screw 5 and to prevent tooth-skipping of the rack 6.

Also, for example, as illustrated in FIG. 8, when the stress Ff toward the front side affects the lens frame 2, the rack 6 moves to the front side and the abutment surface 6d of the rack 6 abuts on the rear end surface 8c of the nut 8. Then, moreover, the nut 8 is pushed toward the front side by the abutment surface 6d and moves slightly, and the tooth 8a of the nut 8 is engaged with the tooth 5a of the lead screw 5. Accordingly, further movement of the lens frame 2 toward the front side is prohibited. That is, when the above-described expression (2) is satisfied, it is possible to prevent the lens frame 2 from moving toward the front side beyond the half pitch of the tooth 5a of the lead screw 5 and to prevent tooth-skipping of the rack 6.

As described above, according to the present embodiment, since the nut 8 that is adjacent to the rack 6 and that is engaged with the lead screw 5 is provided, it is possible to control a movement of the lens frame 2 in the direction of the optical axis O and to control tooth-skipping or a crack of the rack 6 even in a case where strong impact is applied to the lens frame 2 such as a case where the interchangeable lens 100 is dropped.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the above-described embodiment, the projection 8b is provided in the nut 8 and the groove 14c is provided in the lens frame 2 in a coupling part of the nut 8 with the lens frame 2. HoweVer, a projection may be provided in a lens frame 2 and a groove may be provided in a nut 8.

The invention claimed is:

1. A lens driving device comprising:
a lens frame that holds a lens;
a rack provided pivotally with respect to the lens frame around a pivot shaft along an optical axis of the lens;
a lead screw provided along the optical axis;
a spring that makes the rack pivot around the pivot shaft, pushes the rack against the lead screw, and engages a tooth of the rack with a tooth of the lead screw;
a driving unit that rotates the lead screw; and
a nut that includes an end surface facing the rack via a gap C along the optical axis, engages with the lead screw with backlash being included therebetween, and is provided un-rotatably with respect to the lens frame, wherein
in a case where a half pitch of the tooth of the lead screw is A, and the backlash along the optical axis between the lead screw and the nut is B, $$A > B + C$$

is satisfied.

2. The lens driving device according to claim 1, wherein the nut is a whole-circumference nut including a tooth, which engages with the tooth of the lead screw, in whole circumference.

3. The lens driving device according to claim 1, wherein a coupling part of the nut and the lens frame includes a groove provided along the optical axis in one of the nut and the lens frame, and
a projection provided slidably with respect to the groove and provided in another one of the nut and the lens frame.

4. A lens driving device comprising:
a lens frame that holds a lens;
a rack provided pivotally with respect to the lens frame around a pivot shaft along an optical axis of the lens;
a lead screw provided along the optical axis;
a spring that makes the rack pivot around the pivot shaft, pushes the rack against the lead screw, and engages a tooth of the rack with a tooth of the lead screw;
a driving unit that rotates the lead screw; and
a nut that includes an end surface facing the lens frame via a gap D along the optical axis, engages with the lead screw with backlash being included therebetween, and is provided un-rotatably with respect to the lens frame, wherein
in a case where a half pitch of the tooth of the lead screw is A, and the backlash along the optical axis between the lead screw and the nut is B, $$A > B + D$$

is satisfied.

5. The lens driving device according to claim 4, wherein the nut is a whole-circumference nut including a tooth, which engages with the tooth of the lead screw, in whole circumference.

6. The lens driving device according to claim 4, wherein a coupling part of the nut and the lens frame includes a groove provided along the optical axis in one of the nut and the lens frame, and
a projection provided slidably with respect to the groove and provided in another one of the nut and the lens frame.

7. A lens driving device comprising:
a lens frame that holds a lens;
a rack provided pivotally with respect to the lens frame around a pivot shaft along an optical axis of the lens;

a lead screw provided along the optical axis;
a spring that makes the rack pivot around the pivot shaft, pushes the rack against the lead screw, and engages a tooth of the rack with a tooth of the lead screw;
a driving unit that rotates the lead screw; and
a nut that includes one end surface facing the rack via a gap C along the optical axis and another end surface facing the lens frame via a gap D along the optical axis, engages with the lead screw with backlash being included therebetween, and is provided un-rotatably with respect to the lens frame, wherein
in a case where a half pitch of the tooth of the lead screw is A and the backlash along the optical axis between the lead screw and the nut is B, $A > B+C$ and $A > B+D$ are satisfied.

8. The lens driving device according to claim 7, wherein the nut is a whole-circumference nut including a tooth, which engages with the tooth of the lead screw, in whole circumference.

9. The lens driving device according to claim 7, wherein
a coupling part of the nut and the lens frame includes
a groove provided along the optical axis in one of the nut and the lens frame, and
a projection provided slidably with respect to the groove and provided in another one of the nut and the lens frame.

* * * * *